United States Patent [19]

Maaz et al.

[11] Patent Number: 4,825,968

[45] Date of Patent: May 2, 1989

[54] BALANCE BASED ON THE PRINCIPLE OF THE ELECTROMAGNETIC COMPENSATION OF FORCE WITH OPTICAL POSITION SENSOR

[75] Inventors: Günther Maaz, Uslar; Udo Wedeken, Göttingen; Eduard Bierich, Hann-Münden; Eberhard Stadler, Göttingen, all of Fed. Rep. of Germany

[73] Assignee: Sartorius GmbH, Fed. Rep. of Germany

[21] Appl. No.: 136,413

[22] Filed: Dec. 22, 1987

[30] Foreign Application Priority Data

Dec. 24, 1986 [DE] Fed. Rep. of Germany ....... 3644395

[51] Int. Cl.$^4$ .............................................. G01G 7/00
[52] U.S. Cl. ............................. 177/212; 177/DIG. 6
[58] Field of Search ......................... 177/212, DIG. 6

[56] References Cited

U.S. PATENT DOCUMENTS

| 4,184,556 | 1/1980 | Kunz | 177/212 X |
| 4,311,202 | 1/1982 | Kunz | 177/212 |
| 4,354,563 | 10/1982 | Luchinger et al. | 177/212 |
| 4,372,406 | 2/1983 | Komoto et al. | 177/212 |
| 4,429,757 | 2/1984 | Kunz | 177/212 |
| 4,627,505 | 12/1986 | Kunz | 177/212 X |

Primary Examiner—George H. Miller, Jr.
Attorney, Agent, or Firm—Eric P. Schellin

[57] ABSTRACT

There is disclosed a balance based on the principle of the electromagnetic compensation of force with a cylindrical permanent magnet system, with a magnet cover and with a coil for generating the counteracting force that an emitter and a receiver of the optical position sensor be housed inside the magnet cover. The slit diaphragm of the optical position sensor, which extends from below into the area between emitter and receiver, then forms a compact unit with a carrier, e.g., the end of a translation lever, and with a coil and mutual shifts at temperature changes and temperature gradients occur only to a minimal extent.

14 Claims, 3 Drawing Sheets

BALANCE BASED ON THE PRINCIPLE OF THE ELECTROMAGNETIC COMPENSATION OF FORCE WITH OPTICAL POSITION SENSOR

BACKGROUND OF THE INVENTION

The invention relates to a balance based on the principle of the electromagnetic compensation of force with a cylindrical permanent magnet system, with a magnet cover which consists at least partially of a material with high permeability and has the function of magnetically screening the permanent magnet system, with a coil in the air gap of the permanent magnet system for generating the load-dependent counteracting force, with an optical position sensor and with an automatic gain control amplifier for regulating the current through the coil.

Balances of this type are generally known and are described, for example, in DE-GM No. 84 16 544. Emitter and receiver of the optical position sensor are located in this publication on the system carrier, which is fixed to the housing, whereas the slit diaphragm of the optical position sensor is fastened at the end of the translation lever. The principle of the optical position sensor is shown in FIG. 1 by way of explanation: An emitter 102 emits light which passes through slit 107 in slit diaphragm 106 partially onto the two light-sensitive surfaces 104, 105 of optical receiver 103. Emitter 102 and receiver 103 are fastened to parts 101 fixed to the housing, whereas slit diaphragm 106 is connected to the movable parts of the balance and moves with them, in a vertical direction in FIG. 1; this causes the distribution of light onto the two light-sensitive surfaces 104, 105 to change and an electric differential signal results which is proportional to the deflection of slit diaphragm 106. (The form and design of the slit are not essential for the function; even a round perforation in a sheet or a light-permeable area in a coated glass plate which is otherwise non-permeable to light, to cite only two examples, are to be understood under the term "slit diaphragm". Likewise, the term "light" is intended to include infrared or ultraviolet light too, for example).

It is also known from DE-OS No. 30 33 272 that emitter and receiver of the optical position sensor can be fastened on the permanent magnet system.

A disadvantage of all these known designs is the fact that the optical position sensor, which should determine the position of the coil in the air gap of the permanent magnet system, is relatively far removed from the latter. This can result e.g. due to temperature changes and/or temperature gradients in a relatively shifting between coil and position sensor, which adversely influences the precision of the balance.

SUMMARY OF THE INVENTION

The invention therefore has the object of forming a compact unit from the permanent magnet system, the coil and the optical position sensor which unit minimizes temperature differences and changes in position caused by them.

The invention achieves this object as follows: In a balance of the type initially cited, the emitter and the receiver of the optical position sensor are housed in the magnet cover.

BRIEF DESCRIPTION OF THE INVENTION

The invention is described in the following with reference made to FIGS. 2 to 11.

FIG. 1 has already been explained in the above.

Figure 2:
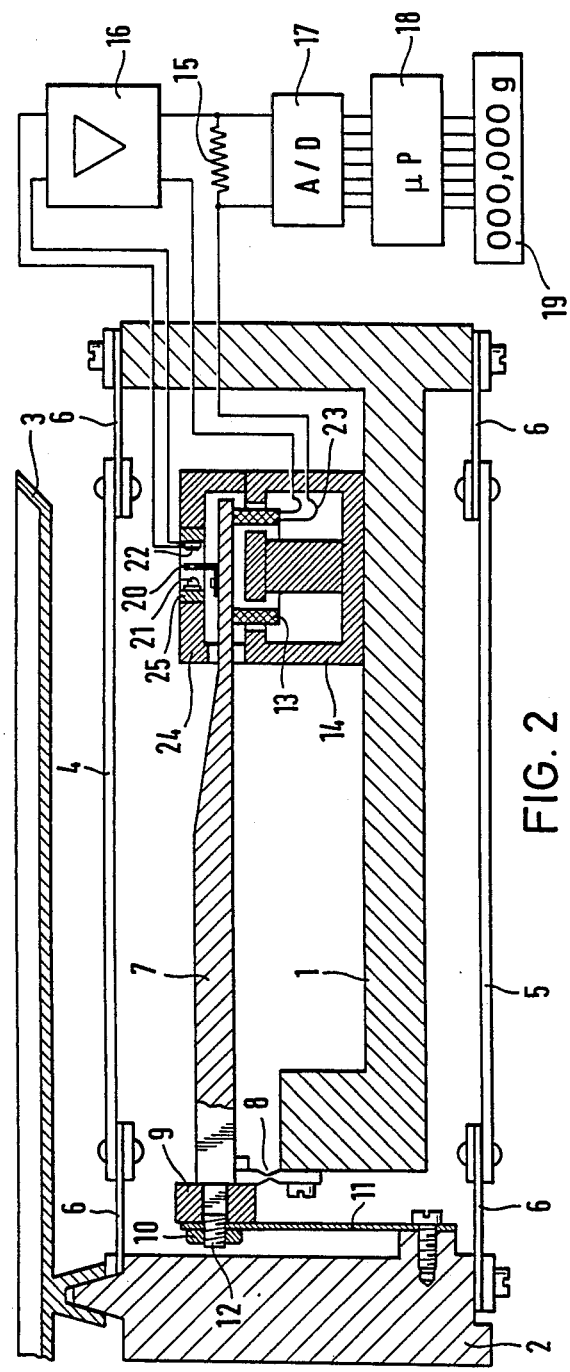
FIG. 2 shows a longitudinal section through the balance.

The electric balance of FIG. 2 consists of system carrier 1 fixed to the housing, to which carrier load receiver 2 is fastened in a vertically movable manner via two guide rods 4, 5 with moving joints 6. Load receiver 2 carries load scale 3 in its upper part for receiving the material to be weighed and transfers the force corresponding to the mass of the weighed material via coupling element 11 to the shorter lever arm of translation lever 7. Translation lever 7 is mounted on system carrier 1 by two spring articulations 8. Coil 13 is fastened to the longer lever arm of translation lever 7. Coil 13 is located in the air gap of permanent magnet system 14 and generates the load-dependent counteracting force. The magnitude of the current through coil 13 is regulated in a known manner by optical position sensor 20, 21, 22 and automatic gain control amplifier 16 in such a manner that equilibrium prevails between the weight of the weighed material and the electromagnetically generated counteracting force. Electrical connection 23 to coil 13 is indicated only in a schematic fashion in FIG. 2. The current through coil 13 generates a measuring voltage on measuring resistor 15 which is fed to analog/digital converter 17. The digitized result is assumed by digital signal processing unit 18 and digitally displayed in display 19.

The optical position sensor consists of radiation emitter 21, whose current supply was omitted for the sake of clarity, of radiation receiver 22 and of slit diaphragm 20. Radiation emitter 21 and radiation receiver 22 are fastened to cover 24 of permanent magnet system 14. More precise details will be explained later with reference made to FIG. 4. Slit diaphragm 20 is fastened to translation lever 7. Slit diaphragm 20 is located approximately in the extension of the axis of coil 13 on the opposite side of translation lever 7. As a result of this arrangement, the back end of translation lever 7, coil 13 and slit diaphragm 20 form a compact, geometrically very stable unit.

Figure 3:
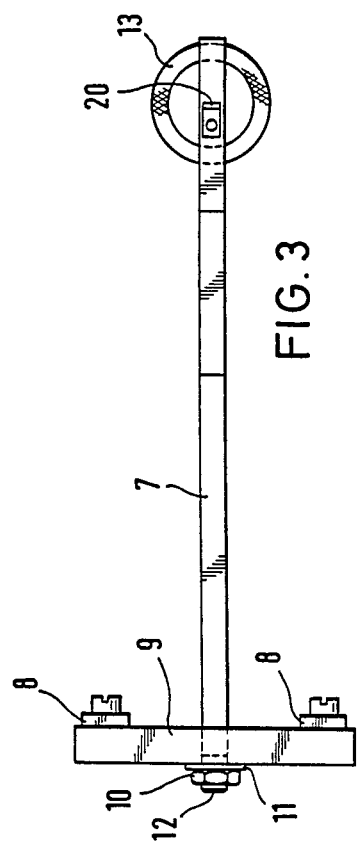
FIG. 3 shows a top view of the translation lever of FIG. 2.

Translation lever 7 is shown in FIG. 3 by itself in a top view in an embodiment given by way of example. In addition to already-described coil 13 and slit diaphragm 20, a front cross traverse 9 can be recognized which carries the two spring articulations 8 and on whose opposite side coupling element 11 is fastened by nut 12 on threaded pin 12. Thus, the thickness of front cross traverse 9 determines the length of the shorter lever arm of translation lever 7.

Figure 4:
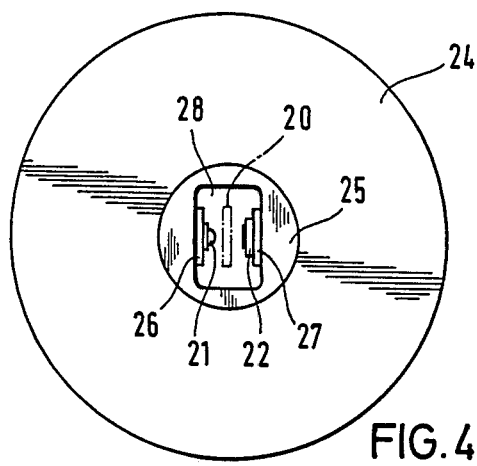
FIG. 4 shows a top view of the magnet cover of FIG. 2.

FIG. 4 shows a top view of magnet cover 24 on a scale which is larger than that of FIG. 2, 3 with details of the optical position sensor. Radiation emitter 21 is located on small plate bar 26 and radiation receiver 22 on small plate bar 27. Both plate bars are fastened, e.g. adhered, to part 25. Part 25 comprises a cylindrical outer surface adjacent to opening 28 for the two plate bars with which surface it fits into a corresponding round perforation in magnet cover 24. This makes it possible to vertically shift emitter and receiver. Fastening after assembly and adjusting is performed in a known manner, e.g. by means of a headless screw (not shown). If adjustability is not needed, part 25 can of course be omitted and approximately rectangular perforation 28 is then located directly in magnet cover 24 (for this, just imagine that circle 25 is not present in FIG. 4). FIG. 4 also shows lug 20 which is fastened to translation lever 7 and extends from below into opening 28.

Figure 5:
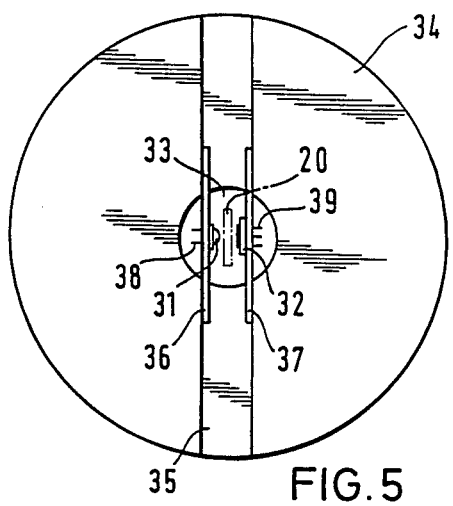
FIG. 5 shows a top view of the magnet cover in a second embodiment.

FIG. 5 shows the magnet cover in a second embodiment. Here, magnet cover 34 comprises round perforation 33 and slit 35 along a diameter. Slit 35 has a depth of ½ to ⅔ of the thickness of magnet cover 34. Two oblong plate bars 36, 37 are fastened in slit 35, whereby plate bar 36 carries radiation emitter 31 and plate bar 37 carries radiation receiver 32. Rear connections 38 of radiation emitter 31 extend through plate bar 36 and are readily accessible there in perforation 33 for an electric connection. In the same manner, connections 39 of radiation receiver 32 extend through plate bar 37 and can likewise be electrically connected there. A depth stop for the plate bars is present through slit 35 so that a very reproducible fastening, e.g. adhering, of the plate bars in magnet cover 34 is possible. Naturally, the slit does not have to have the full length of the diameter of magnet cover 34 a length corresponding to the lengths of plate bars 36, 37 is sufficient. Likewise, slit 35 can be somewhat offset laterally if more space is required for connections 38 than for connections 39 or vice versa. FIG. 5 also shows slit diaphragm 20 again, which is connected to the movable part of the balance.

Figure 6:
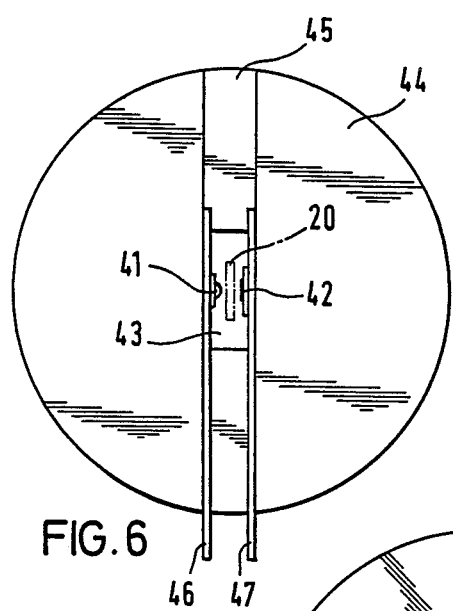
FIG. 6 shows a top view of the magnet cover in a third embodiment.

FIG. 6 shows a third embodiment of the magnet cover. Here, magnet cover 44 comprises only one slit 45 along a diameter which is sunk in the middle so deeply that opening 43 is created here. Slit diaphragm 20 extends through this opening 43 from below. Radiation emitter 41 is mounted on oblong plate bar 46, whereby it is assumed that the contact occurs on the front side and the plate bar can rest with its back side and the lower edge directly on the side surface and on the bottom of slit 45. The electric connections are then made on the part of plate bar 46 which extends beyond magnet cover 44. Once again, plate bar and magnet cover can be connected by adhering. The fastening and contacting of radiation receiver 42 on oblong plate bar 47 is performed in the same manner. The advantage of this embodiment resides in its simple manufacture, since the working of the magnet cover is limited to a milling process for slit 45 including opening 43.

Figure 7:
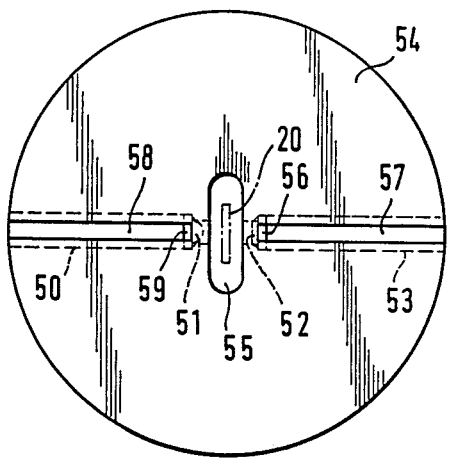
FIG. 7 shows a top view of the magnet cover in a fourth embodiment.

FIG. 7 shows a fourth embodiment of the magnet cover. Here, magnet cover 54 comprises a central perforation 55 which can be round or (as shown) approximately rectangular and two radial bores 50, 53 shown in dotted lines which run from opposite points of the outer edge to central perforation 55. These radial bores 50, 53 do not run centrally in magnet cover 54 but rather are offset upward to the extent that they cut the upper limiting plane and narrow slits 57, 58 are formed there. This embodiment is intended for radiation emitters and receivers which are built up on a small circular plate with a lug as extension. This lug can extend through the narrow slits so that the narrow slits afford protection against the rotation of emitter and receiver at the same time. Therefore, in FIG. 7 radiation emitter 51 is shown only in dotted lines in bore 50 and only its lug 59 can be seen in narrow slit 58. Likewise, only lug 56 in narrow slit 57 can be recognized from radiation receiver 52 shown in dotted lines.

Figure 8:
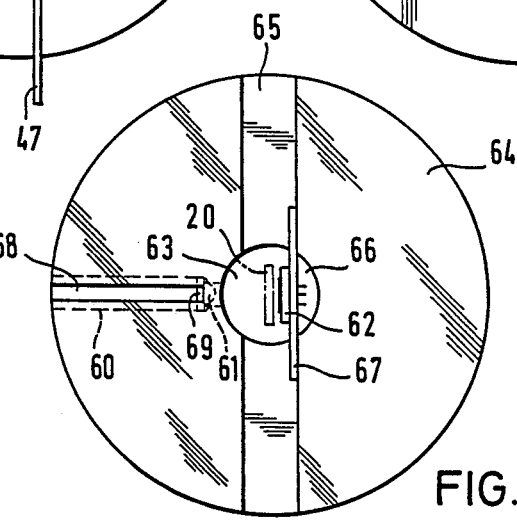
FIG. 8 shows a top view of the magnet cover in a fifth embodiment.

FIG. 8 shows a fifth embodiment of the magnet cover. Here, magnet cover 64 comprises slit 65, central perforation 63 and radial bore 60 vertical to slit 65. Radial bore 60 is offset upward, just as was described for FIG. 7, to the extent that narrow slit 68 is produced in which lug 69 of radiation emitter 61 is guided. Radiation receiver 62 rests on plate bar 67 which is adhered fast in slit 65. Radiation receiver 62 can be contacted on the back side of plate bar 67 in back part 66 of central perforation 63. However, plate bar 67 can just as well be designed to be longer, as in FIG. 6 and the contact can occur in the area outside of magnet cover 64. This embodiment is especially advantageous if radiation emitter 61 is present in a round form while radiation receiver 62 is present in a flat form.

Figure 1:
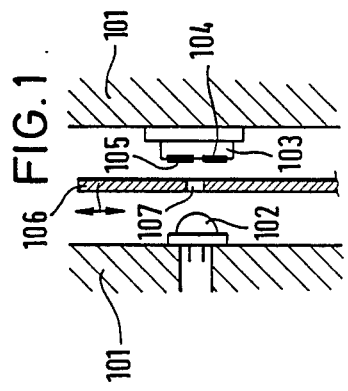
Figure 9:
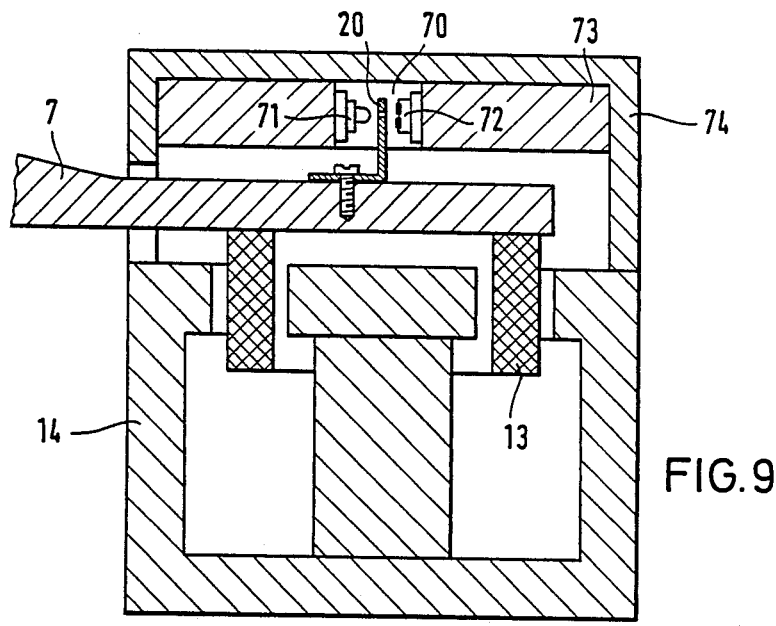
FIG. 9 shows a section through the magnet cover and the permanent magnet system in another material combination.

It was previously assumed that the magnet cover consisted entirely of one material; in order that the magnet cover can fulfill its screening function, it must be of soft iron or a similar material with high permeability. However, it is also possible to design the magnet cover as a sandwich construction consisting of two different materials. This is shown in FIG. 9. Here, the magnet cover consists of a disk 73 of any material desired and of a thin casing 74 of soft iron. Here, disk 73 comprises a central perforation 70 which carries radiation emitter 71 and radiation receiver 72 of the optical scanning in the manner described above. Slit diaphragm 20 extends from below into perforation 70. Permanent magnet system 14, coil 13 and translation lever 7 can be designed as in FIG. 1. Disk 73 can be designed in one of the different embodiments described above, whereby soft iron casing 74 can be entirely closed on top or can comprise a central perforation on top, according to the design.

Figure 10:
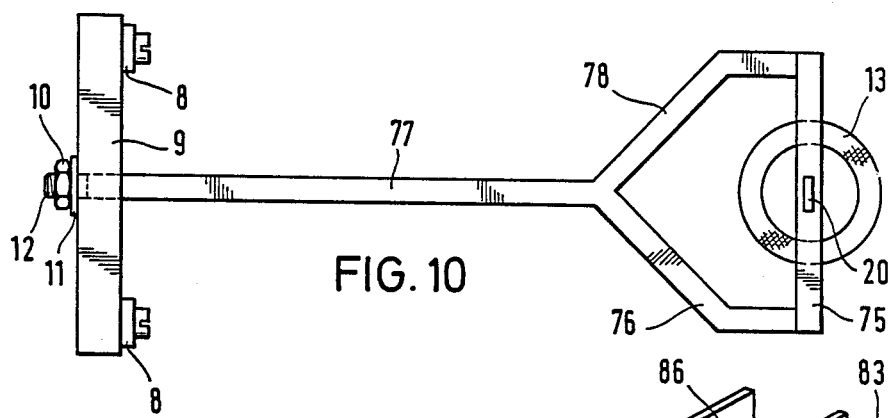
FIG. 10 shows a top view of the translation lever in another embodiment.

FIG. 10 shows the translation lever again in another embodiment. Here, translation lever 77 is bifurcated at the end like a fork into two parts 76, 78. Cross traverse 75 connects these two parts 76, 78 and carries coil 13 on its bottom and slit diaphragm 20 on its top. Cross traverse 75 can consist e.g. of aluminum or brass. It can also consist of a ceramic so that it does not transfer the heat generated in coil 13 as readily to translation lever 76, 77, 78. The slit diaphragm could then, e.g., also be constructed as a thin disk with slit in one piece with cross traverse 75. The direction of the slit diaphragm, parallel to cross traverse 75 or parallel to part 77 of the translation lever, can be as desired. Likewise, the plane of the slit diaphragm can naturally also be vertical, as shown, or parallel to translation lever 7 in all previously described embodiments in which translation lever 7 functions directly as carrier for coil 13 and slit diaphragm 20. The magnet cover must then merely be rotated correspondingly by 90°, if necessary.

Figure 11:
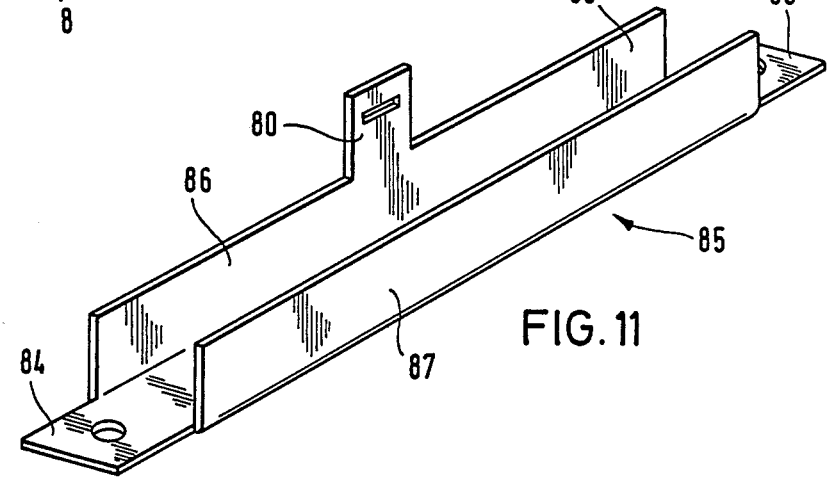
FIG. 11 shows a perspective view of the cross traverse of FIG. 10 in another embodiment.

FIG. 11 shows an embodiment of the cross traverse which is a variant of FIG. 10. This cross traverse 85 is constructed as a bent punch part with U-shaped cross section. The horizontal piece of the "U" is made longer on both sides so that flaps 83, 84 are produced with which cross traverse 85 can be screwed from below to the two parts 76, 78 of translation lever 77 (in FIG. 10). The one vertical piece 87 exhibits the same height along its entire length whereas the other piece 86 is lengthened in the middle so that slit diaphragm 80 is produced. The variant permits a very simple manufacture of the cross traverse and of the slit diaphragm.

What is claimed is:

1. In a balance on the principle of electromagnetic compensation of force with a cylindrical permanent magnet system having an air gap,
   a magnet cover which consists at least partially of a material with a high permeability and has the function of magnetically screening the permanent magnet system,
   a coil in the air gap of the permanent magnet system for generating a load-dependent counteracting force,
   an optical position sensor coupled to an automatic gain control amplifier for regulating current through the coil,
   an emitter and a receiver of the optical position sensor being separately mounted and housed inside the magnet cover, and
   fastening means for securement and adjustment of the optical position sensor in the magnet cover.

2. Balance according to claim 1, wherein the magnet cover comprises a central perforation.

3. Balance according to claim 2, wherein the magnet cover additionally comprises a slit along a diameter or offset so slightly laterally that it still meets the central perforation.

4. Balance according to claim 1, wherein the magnet cover comprises a slit approximately along a diameter and that this slit is sunk so deeply in the center of the magnet cover that a through opening is produced at this point.

5. Balance according to claim 1, wherein the magnet cover comprises a central perforation and two radial bores which run from opposite points of the outer edge to the central perforation.

6. Balance according to claim 1, wherein the magnet cover comprises a central perforation, a slit along a diameter or offset so slightly laterally that it still meets the central perforation and comprises a radial bore vertical to the slit which bore terminates in the central perforation.

7. Balance according to claim 6, wherein the radial bore does not run in the middle of the magnet cover but rather is offset in the direction of the upper or lower limiting plane.

8. Balance according to claim 7, wherein the radial bore cuts the upper or the lower limiting plane.

9. Balance according to claim 8, wherein the magnet cover consists entirely of a material with high permeability.

10. Balance according to claim 8, wherein the magnet cover consists of any material desired and carries a layer of a material with high permeability on the one limiting plane.

11. Balance according to claim 10, wherein a carrier extends approximately along a diameter at least partially through the permanent magnet system and carries the coil on its top or its bottom and carries the slit diaphragm of the optical position sensor on the opposite side.

12. Balance according to claim 11, wherein the carrier is designed as a bent punch part with U-shaped cross section, whereby the slit diaphragm of the optical position sensor is formed by the prolongation of one of the shanks.

13. Balance according to claim 11, wherein the carrier consists of ceramics.

14. Balance according to claim 1, wherein
    the optical position sensor is disposed and mounted in a part having an outer cylindrical surface adjacent to an opening in the magnet cover,
    two spatially disposed plate bars in the part for supporting the emitter and the receiver,
    the part having the cylindrical surface fitting into a corresponding mating and receiving perforation in the magnet cover, and
    the fastening means providing for securement and adjustment of the part in the magnet cover.

* * * * *